United States Patent [19]

Martin

[11] Patent Number: 5,740,622
[45] Date of Patent: Apr. 21, 1998

[54] ANTENNA MOUNTED AUTOMOBILE AND TRUCK PENNANT

[76] Inventor: René J. Martin, 115 Prince Ave., Melbourne, Fla. 32901

[21] Appl. No.: 692,271

[22] Filed: Aug. 5, 1996

[51] Int. Cl.⁶ ..................................... G09F 21/04
[52] U.S. Cl. .......... 40/591; 116/28 R; 116/173; 248/218.4; 248/222.41; 403/315; 403/353; 403/389
[58] Field of Search ............. 40/591; 116/28 R, 116/173; 248/218.4, 222.11, 222.41; 403/315, 319, 353, 384, 389

[56] References Cited

U.S. PATENT DOCUMENTS

| | | | |
|---|---|---|---|
| 2,168,484 | 8/1939 | Loux | 116/173 |
| 2,856,891 | 10/1958 | Solomon | 116/173 |
| 2,905,140 | 9/1959 | Acklam | 116/173 |
| 3,172,220 | 3/1965 | Christensen | 40/591 X |
| 3,636,912 | 1/1972 | Kamp | 116/173 X |
| 3,672,700 | 6/1972 | Marose | 40/591 X |
| 3,678,456 | 7/1972 | Gruber | 40/591 X |
| 3,712,263 | 1/1973 | Faragosa | 116/28 R |
| 4,582,017 | 4/1986 | Ostermiller | 40/591 X |
| 4,875,431 | 10/1989 | Dobosz | 116/173 |
| 5,016,372 | 5/1991 | Gold | 40/591 |
| 5,052,327 | 10/1991 | Comfort | 116/173 X |
| 5,363,792 | 11/1994 | Petechik | 116/28 R |
| 5,468,022 | 11/1995 | Linder et al. | 283/900 X |
| 5,590,621 | 1/1997 | Sectish | 116/173 |

Primary Examiner—Brian K. Green
Assistant Examiner—Andrea Chop
Attorney, Agent, or Firm—Paul S. Rooy

[57] ABSTRACT

An antenna-mounted pennant comprising a flag attached to a body, and a pin. The body comprises two mutually parallel bores: a pin bore and an antenna bore. The pin bore communicates with the antenna bore. The pin bore is sized to frictionally admit the pin. The antenna bore is sized to admit an upper extreme of a standard tapered automotive or boat antenna. Once installed on a tapered antenna, the antenna-mounted pennant is entrapped between the antenna tip and the increasing diameter of the antenna. Where the antenna-mounted pennant is slid downwards on the antenna, the increasing diameter of the tapered antenna shaft renders the fit between the antenna shaft and the antenna bore frictional, whereby the antenna-mounted pennant is immobilized on the antenna shaft.

8 Claims, 2 Drawing Sheets

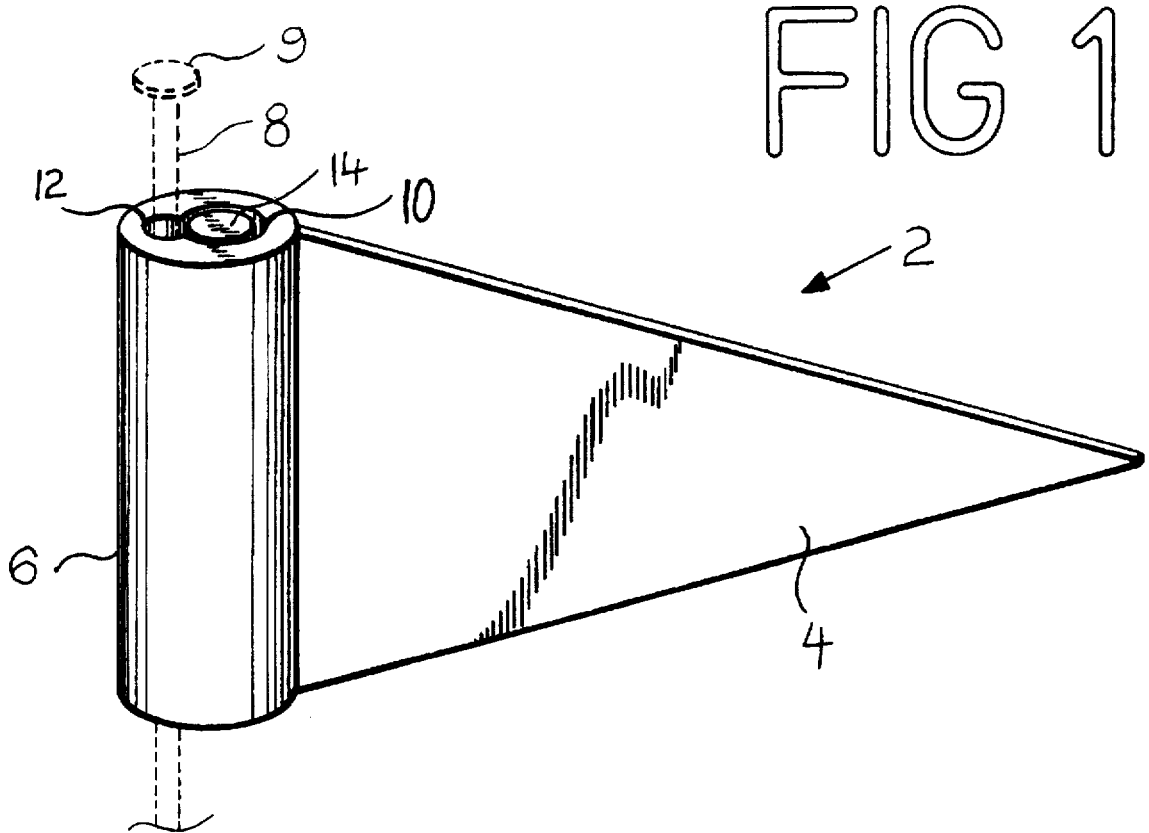
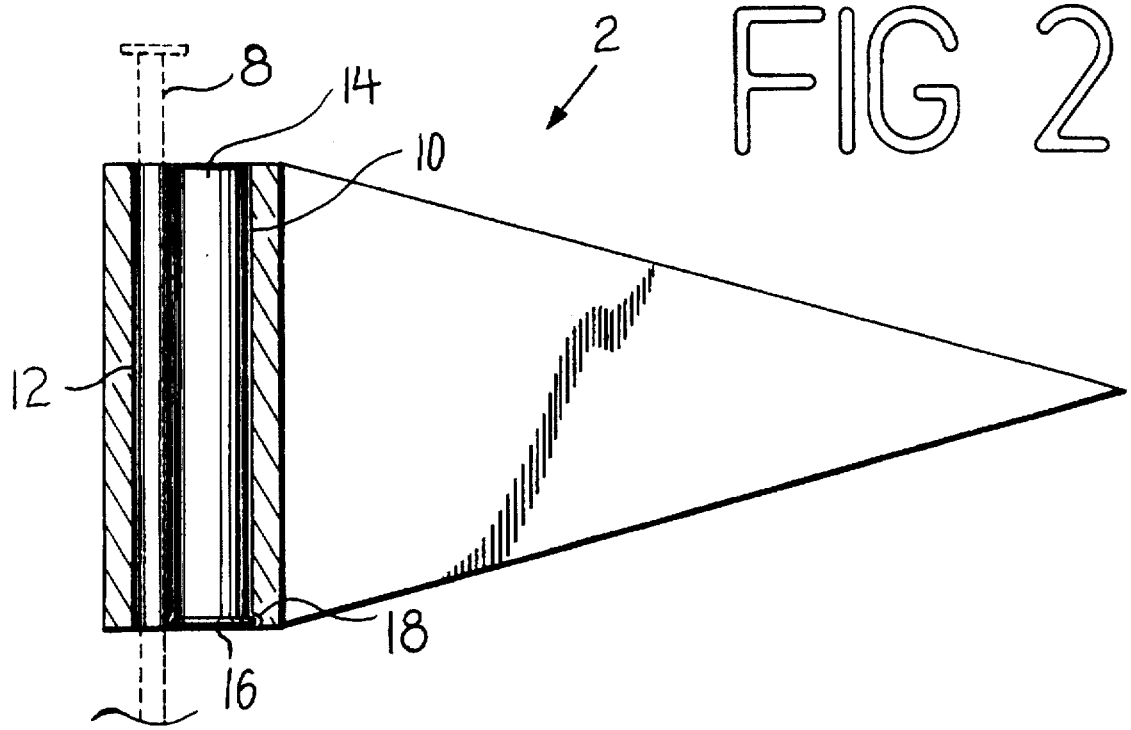

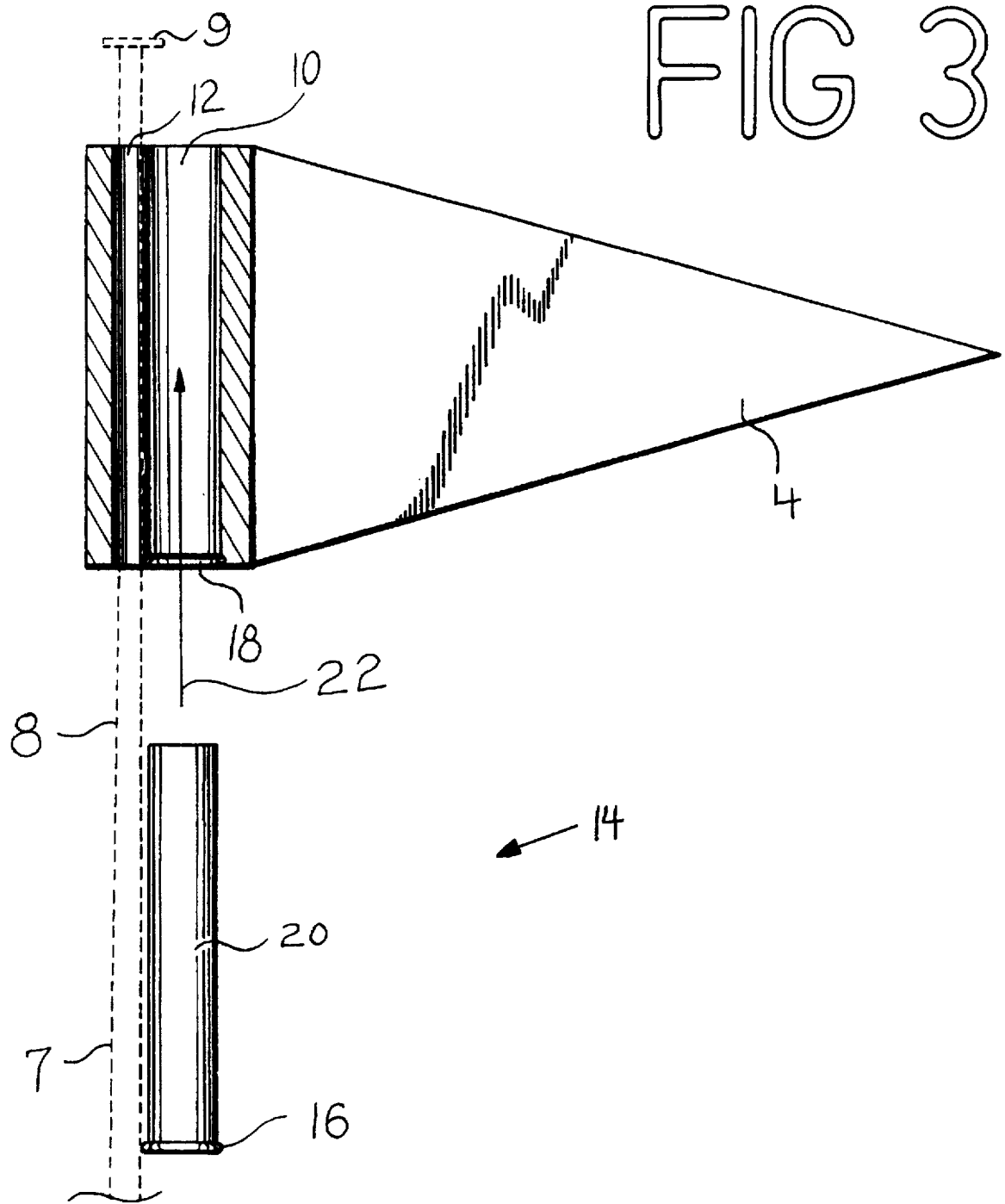

ANTENNA MOUNTED AUTOMOBILE AND TRUCK PENNANT

BACKGROUND OF THE INVENTION

1. Field of the Invention

This invention relates to pennants, and in particular to an antenna-mounted pennant.

2. Background of the Invention

Pennants and other display devices are extensively used to promote a wide variety of causes such as athletic teams, professional organizations, political groups, etc. The current art includes window decals, bumper stickers, window-mounted car flags, window-mounted car socks, and license tags.

EXISTING DESIGNS

The window decal is widely used. It does have drawbacks. Once mounted it is a permanent or semi-permanent fixture. It can block the field of vision of the vehicle operator and cause accidents. It is therefore not the safest way to promote a team or organization.

The bumper sticker is another widely used idea. However, it is also semi-permanent, and poorly located, usually at the bottom of the vehicle on the bumper. Although bumper stickers are distinctly traditional and often witty, they generally go unnoticed.

The window-mounted car flag and car sock also suffer from disadvantages. They tend to get tangled, and at slow vehicle speeds, they lose their support, sag, and become illegible.

License tags are a perennial favorite to promote a team or organization. They also have problems. Display tags are usually mounted low on the front of the vehicle and thus are not very visible. Due to their low installation, they are often dirty and may be damaged by road debris. In addition, display tags are illegal in some states, where two license plates (front and rear) are required.

SUMMARY OF THE INVENTION

Accordingly, it is an object of the present invention to provide an antenna-mounted pennant which is mounted outside the passenger cabin of a vehicle, and can be easily removed and replaced at will.

It is another object of the present invention to provide an antenna-mounted pennant which does not obstruct the vision of the vehicle operator.

It is still another object of the present invention to provide an antenna-mounted pennant which saves resources by using a decal which may be changed, without discarding the pennant flag itself.

It is a further object of the present invention to provide an antenna-mounted pennant which does not get tangled, droop, or lose shape in slow-moving traffic, or when the vehicle on which it is mounted is stopped. It will always display its message no matter what the speed of the vehicle.

It is still another object of the present invention to provide an antenna-mounted pennant which is mounted high in a center part of a vehicle where its message is noticed and understood.

It is another object of the present invention to provide an antenna-mounted pennant which may be displayed in states which require both a front and a rear license plate.

It is still another object of the present invention to provide an antenna-mounted pennant which incorporates two sides for display. Thus two different messages may be posted, thereby increasing its observability, functionality, and utility.

The antenna mounted automobile & truck pennant is an invention that will allow its users greater flexibility, safety, and observability over the prior art. It allows the pennant's user to support their team or organization when appropriate. After the event, the pennant can be removed and stored for future events.

The pennant is superior to window decals because it does not distract or deny the vehicle operator the field of vision necessary to safely operate the vehicle.

The pennant is not discarded but saved when the vehicle is sold or transferred to another owner.

The pennant is superior to the bumper sticker because it is located in a highly visible position and will not go unnoticed, or be distorted or damaged by road wear and car washes.

The pennant is far superior to window-mounted flags and wind socks because it is rigid in nature and will retain its flag-like shape no matter what speed the vehicle is operating at. Unlike the flag or wind sock, the antenna-mounted pennant will continue to display two messages even when the vehicle is stopped.

The pennant is mounted as a pennant or flag should be mounted, on a pole or antenna. This design is more effective than merely placing a display license tag in a place that a license tag may be required to be displayed.

BRIEF DESCRIPTION OF THE DRAWINGS

The invention, together with the other objects, features, aspects and advantages thereof will be more clearly understood from the following in conjunction with the accompanying drawings.

Two sheets of drawings are provided. Sheet one contains FIGS. 1 and 2. Sheet two contains FIG. 3.

FIG. 1 is a side isometric view of an antenna-mounted pennant mounted on an antenna.

FIG. 2 is a side cross-sectional view of an antenna-mounted pennant mounted on an antenna.

FIG. 3 is a side cross-sectional view or an antenna-mounted pennant with pin removed.

DETAILED DESCRIPTION OF THE PREFERRED EMBODIMENT

Referring now to FIG. 1, antenna-mounted pennant 2 comprises flag 4, body 6, and pin 14. Flag 4 is attached to body 6. Body 6 comprises pin bore 10 communicating with antenna bore 12. Pin bore 6 is sized to frictionally admit pin 14. In addition, pin bore 6 is sized to freely admit antenna tip 9. Antenna bore 12 is sized to freely admit a portion of antenna 8 which is disposed adjacent antenna tip 9.

FIG. 2 depicts antenna-mounted pennant 2 mounted on antenna 8. Antenna 8 is disposed within antenna bore 12. Pin 14 is disposed within pin bore 10. Due to the frictional nature of the engagement between pin 14 and pin bore 10, pin 14 tends to remain within pin bore 10, thus entrapping antenna 8 within antenna bore 12.

In the preferred embodiment, pin 10 comprised pin lip 16 sized to frictionally engage pin bore 10 or pin bore groove 18. Pin 14 was installed by pushing pin 14 into pin bore 10 until pin lip 16 frictionally engaged pin bore groove 18. In this manner, pin lip 16 cooperated with pin bore 10 or pin bore groove 18 to enhance the frictional nature of the fit between pin 14 and pin bore 10, thus helping retain pin 14 within pin bore 10 when antenna-mounted pennant 2 is installed on antenna 8. In addition, pin lip 16 applies additional force directly on antenna 8, thus providing additional holding or gripping of antenna 8 within antenna bore 12.

As may be observed in FIG. 3, most modern antennas 8 comprise antenna tip 9 (commonly spherical or disk-shaped) attached to antenna shaft 7. Antenna shaft 7 is tapered such that the antenna shaft 7 diameter increases while descending away from antenna tip 9. Thus the diameter of antenna shaft 7 increases from antenna tip 9 downwards.

Antenna bore 12 is sized to freely admit that portion of antenna 8 which is disposed adjacent antenna tip 9. Once antenna-mounted pennant 2 is installed on antenna 8, antenna-mounted pennant 2 may be slid downward on antenna 8 until the fit between antenna shaft 7 and antenna bore 12 becomes frictional. At that point, antenna-mounted pennant 2 will be vertically immobilized on antenna 8 due to the frictional engagement between antenna bore 12 and tapered antenna shaft 7.

FIG. 3 depicts antenna-mounted pennant 2 in the process of being installed on antenna 8. First, antenna tip 9 is inserted completely through antenna bore 12. Then a portion of antenna shaft 7 adjacent antenna tip 9 is inserted into antenna bore 12. Pin 14 is then completely inserted into pin bore 10 by pushing pin shaft 20 into pin bore 10 as indicated by arrow 22. Where antenna-mounted pennant 2 comprises pin lip 16 and pin bore groove 18, pin 14 is inserted into pin bore 10 until pin lip 16 frictionally engages pin bore groove 16. Finally, antenna-mounted pennant 2 is slid down antenna 8 away from antenna tip 9 until the downwardly increasing taper of antenna shaft 7 causes the fit between antenna bore 12 and antenna shaft 7 to become frictional.

When installed on a vehicle antenna 8 as described above, antenna-mounted pennant 2 is locked onto antenna 8 very securely. Due to the rigid nature of the material from which antenna-mounted pennant 2 is made, pin 14 securely locks antenna 8 within antenna bore 12, and antenna bore 12 will not deform elastically sufficiently to allow antenna-mounted pennant 2 to slide off antenna 8 over antenna tip 9. A prototype antenna-mounted pennant 2 was road tested at highway speeds up to 75 miles per hour (MPH), and remained securely attached to the vehicle antenna.

In the preferred embodiment, flag 4, body 6 and pin 14 were manufactured of plastic, nylon, metal, or other appropriate material. A decal bearing indicia may be adhesively attached to either or both sides of flag 4. Antenna 8 was a standard, off-the-shelf automotive, truck or boat tapered antenna.

While a preferred embodiment of the invention has been illustrated herein, it is to be understood that changes and variations may be made by those skilled in the art without departing from the spirit of the appending claims.

DRAWING ITEM INDEX 2 antenna-mounted pennant
4 flag
6 body
7 antenna shaft
8 antenna
9 antenna tip
10 pin bore
12 antenna bore
14 pin
16 pin lip
18 pin bore groove
20 pin shaft
22 arrow

I claim:

1. An antenna-mounted pennant comprising a flag attached to a body, and a pin, said body comprising a pin bore communicating with an antenna bore, said pin bore being sized to frictionally admit said pin, said body and said flag being of one-piece construction, said antenna bore being substantially circular in cross-section, said pin comprising a pin lip, and said pin bore comprising a pin bore groove sized to frictionally engage said pin lip, whereby the frictional fit between said pin and said pin bore may be enhanced.

2. The antenna-mounted pennant of claim 1 wherein said antenna bore and said pin bore are substantially parallel.

3. The antenna-mounted pennant of claim 1 in combination with an antenna, said antenna comprising an antenna shaft, said antenna shaft being tapered from one extreme, said antenna bore being sized to admit a smaller-diameter extreme of said antenna shaft.

4. The antenna-mounted pennant of claim 3 wherein said antenna further comprises an antenna tip attached to said smaller-diameter extreme of said antenna shaft, said antenna tip being of greater diameter than said antenna shaft, said pin bore being sized to freely admit said antenna tip, whereby when said antenna-mounted pennant is installed on said antenna, said antenna-mounted pennant is entrapped between said antenna tip and an increasing diameter of said tapered antenna shaft.

5. An antenna-mounted pennant comprising a flag, a body and a pin, said flag being attached to said body, said body comprising an antenna bore communicating with a pin bore, said pin bore and said antenna bore being substantially parallel, said pin bore being sized to frictionally admit said pin, said body and said flag comprising a one-piece assembly, said antenna bore being substantially circular in cross-section, said pin comprising pin lip, and said pin bore comprising a pin bore groove sized to frictionally engage said pin lip, whereby the frictional fit between said pin and said pin bore may be enhanced.

6. In combination, the antenna-mounted pennant of claim 5 and an antenna, said antenna comprising an antenna tip attached to an extreme of an antenna shaft, a diameter of said antenna shaft increasing away from said antenna tip, said pin bore being sized to freely admit said antenna tip, said antenna bore being sized to admit a portion of said antenna shaft adjacent said antenna tip.

7. The antenna-mounted pennant of claim 5 wherein said antenna-mounted pennant is manufactured of rigid material.

8. An antenna-mounted pennant comprising a flag attached to a body, and a pin, said body comprising a pin bore communicating with an antenna bore, said pin bore being sized to frictionally admit said pin, said pin bore, said antenna bore, and said pin being substantially circular in cross-section, said pin comprising a pin lip, and said pin bore comprising a pin bore groove sized to frictionally engage said pin lip, whereby the frictional fit between said pin and said pin bore may be enhanced.

* * * * *